(12) United States Patent
Greene et al.

(10) Patent No.: US 9,221,700 B2
(45) Date of Patent: Dec. 29, 2015

(54) METHOD FOR INHIBITING THE FORMATION AND DEPOSITION OF SILICA SCALE IN AQUEOUS SYSTEMS

(75) Inventors: Nathaniel T. Greene, Aurora, IL (US); Jasbir S. Gill, Naperville, IL (US); Martin R. Godfrey, Eagan, MN (US); Cheryl Williams, Lockport, IL (US)

(73) Assignee: Ecolab USA Inc., St. Paul, MN (US)

( * ) Notice: Subject to any disclaimer, the term of this patent is extended or adjusted under 35 U.S.C. 154(b) by 1204 days.

(21) Appl. No.: 12/976,013

(22) Filed: Dec. 22, 2010

(65) Prior Publication Data

US 2012/0161068 A1 Jun. 28, 2012

(51) Int. Cl.
*C02F 5/10* (2006.01)
*C02F 5/14* (2006.01)
*C02F 5/04* (2006.01)
*C02F 103/02* (2006.01)

(52) U.S. Cl.
CPC . *C02F 5/10* (2013.01); *C02F 5/145* (2013.01); *C02F 2103/023* (2013.01); *C02F 2303/08* (2013.01); *C02F 2305/04* (2013.01)

(58) Field of Classification Search
None
See application file for complete search history.

(56) References Cited

U.S. PATENT DOCUMENTS

| | | | | |
|---|---|---|---|---|
| 4,471,100 A * | 9/1984 | Tsubakimoto et al. | | 525/367 |
| 4,500,693 A * | 2/1985 | Takehara et al. | | 526/240 |
| 4,532,047 A | 7/1985 | Dubin | | |
| 4,874,527 A | 10/1989 | Gill | | |
| 4,895,622 A * | 1/1990 | Barnett et al. | | 162/199 |
| 4,933,090 A | 6/1990 | Gill et al. | | |
| 5,078,879 A | 1/1992 | Gill et al. | | |
| 5,078,891 A | 1/1992 | Sherwood et al. | | |
| 5,152,403 A | 10/1992 | Patel | | |
| 5,180,498 A | 1/1993 | Chen et al. | | |
| 5,271,847 A * | 12/1993 | Chen et al. | | 210/697 |
| 5,271,862 A | 12/1993 | Freese | | |
| 5,282,905 A | 2/1994 | Reichgott et al. | | |
| 5,292,379 A * | 3/1994 | Reichgott et al. | | 148/251 |
| 5,300,231 A | 4/1994 | Cha | | |
| 5,391,238 A * | 2/1995 | Reichgott et al. | | 148/247 |
| 5,527,468 A | 6/1996 | Boyette et al. | | |
| 5,658,465 A | 8/1997 | Nicholas et al. | | |
| 6,162,391 A * | 12/2000 | Kowata et al. | | 422/16 |
| 6,444,747 B1 * | 9/2002 | Chen et al. | | 524/807 |
| 6,641,754 B2 * | 11/2003 | Buentello et al. | | 252/180 |
| 6,966,213 B2 | 11/2005 | Hoots et al. | | |
| 7,169,236 B2 | 1/2007 | Zeiher et al. | | |
| 2002/0153505 A1 | 10/2002 | Blakemore et al. | | |
| 2003/0052303 A1 * | 3/2003 | Buentello et al. | | 252/175 |
| 2007/0073015 A1 * | 3/2007 | Sakamoto et al. | | 526/240 |
| 2008/0011687 A1 | 1/2008 | Campo et al. | | |
| 2009/0294374 A1 * | 12/2009 | Gill et al. | | 210/699 |
| 2012/0022192 A1 * | 1/2012 | Nishida | | 524/123 |

FOREIGN PATENT DOCUMENTS

| | | |
|---|---|---|
| EP | 0323680 A2 | 7/1989 |
| EP | 0654449 A1 | 5/1995 |
| JP | S5175681 A | 6/1976 |
| JP | 56155692 | 12/1981 |
| JP | S5784794 A | 5/1982 |
| JP | S61293598 A | 12/1986 |
| JP | 2138319 | 1/1998 |
| JP | 10057988 | 3/1998 |
| JP | 2003176349 A | 6/2003 |
| JP | 2006334495 A | 12/2006 |
| JP | 2010172816 A | 8/2010 |

OTHER PUBLICATIONS

Pedenaud et al.,"Silica Scale Inhibition for Steam Generation in OTSG Boiler," Society of Petroleum Engineers, Mar. 2004, SPE 86934.

* cited by examiner

*Primary Examiner* — Joseph D Anthony
(74) *Attorney, Agent, or Firm* — Brinks Gilson & Lione; Eric D. Babych

(57) ABSTRACT

This invention relates to an improved method for inhibiting the formation and deposition of silica and silicate compounds in a water system. In particular, the method includes adding to the water system a relatively low molecular weight organic, anionic polymer. The polymer preferably has an acrylic acid or methacrylic acid functionality and is preferably selected from one or more of homopolymers of acrylic acid, a methacrylic acid/polyethylene glycol allyl ether copolymer, a homopolymer of methacrylic acid, an acrylic acid/polyethylene glycol allyl ether copolymer, and an acrylic acid/1-allyloxy-2-hydroxypropane sulfonic acid copolymer, homopolymers of maleic anhydride, copolymers of maleic anhydride and polyethylene glycol allyl ether, and combinations thereof.

14 Claims, No Drawings

METHOD FOR INHIBITING THE FORMATION AND DEPOSITION OF SILICA SCALE IN AQUEOUS SYSTEMS

TECHNICAL FIELD

This invention relates generally to silica scale inhibitors. More specifically, this invention relates to a method for inhibiting the formation and deposition of silica and silicate compounds in water systems with low molecular weight anionic polymers.

BACKGROUND OF THE INVENTION

In many parts of the world, amorphous silica scales cause significant fouling problems when industrial waters contain high quantities of silica. For the most part, high quantities of silica means that the industrial waters contain at least 5 ppm and up to about 500 ppm dissolved silica and may contain higher quantities of silica either in dissolved, dispersed or colloidal forms.

The solubility of silica adversely limits the efficient use of water in industrial applications, such as cooling, boiler, geothermal, reverse osmosis, and papermaking. Specifically, water treatment operations are limited because the solubility of silica at about 150 ppm can be exceeded when minerals are concentrated during processing. This excess can result in the precipitation and deposition of amorphous silica and silicates with consequential loss of equipment efficiency. Moreover, the accumulation of silica on internal surfaces of water treatment equipment, such as boilers, cooling, and purification systems, reduces heat transfer and fluid flow through heat exchange tubes and membranes.

Once the silica scale forms on water treatment equipment, the removal of such scale is very difficult and costly. With high silica water, therefore, cooling and reverse osmosis systems typically operate at low water-use efficiency to assure that the solubility of silica is not exceeded. Under these conditions, however, reverse osmosis systems must limit their pure water recovery rate and cooling systems must limit water recycling. In both cases, water discharge volumes are large.

Various additives have been employed over the years to inhibit silica deposition. The current technologies for silica scale control in industrial cooling systems involve the use of either colloidal silica dispersants or silica polymerization inhibitors. Dispersant technologies have shown little activity, being able to stabilize only slight increases of total silica in a tower. For instance, by feeding a dispersant, silica levels may increase from 150-200 to 180-220 ppm, which is often an undetectable increase in silica cycles.

On the other hand, silica polymerization inhibitors have shown to be more effective against silica scale deposition. For example, U.S. Pat. No. 4,532,047 to Dubin relates to the use of a water-soluble low molecular weight polypolar organic compound for inhibiting amorphous silica scale formation on surfaces in contact with industrial waters. Likewise, U.S. Pat. No. 5,658,465 to Nicholas et al. relates to the use of polyoxazoline as a silica scale inhibition technology. These polymerization inhibitors have allowed for increases in soluble silica to greater than 300 ppm without scale formation.

There thus exists an industrial need for scale control agents having increased performance over those currently known in the art.

SUMMARY OF THE INVENTION

Accordingly, the present disclosure provides a method for inhibiting the formation and deposition of silica and silicate compounds in a water system. The inventors have discovered that certain low molecular weight polymers are effective inhibitors of soluble silica polymerization and scale deposition in water systems. In an embodiment of the invention, the method includes adding to the water in the water system an effective inhibiting amount of one or more relatively low molecular weight anionic polymers. The polymer is preferably selected from a group comprised of homopolymers of acrylic acid, copolymers of methacrylic acid, and polyethylene glycol allyl ether, homopolymers of methacrylic acid, copolymers of acrylic acid and polyethylene glycol allyl ether and copolymers of acrylic acid and 1-allyloxy-2-hydroxy propane sulfonic acid, homopolymers of maleic anhydride, copolymers of maleic anhydride and polyethylene glycol allyl ether and combinations thereof. Such polymers are disclosed in, for example, in JP2138319 (A), "Allyl Ether-Maleic Anhydride Copolymer," to Yasukochi Toru et al.

It is an advantage of the invention to provide a >50% increase in the dispersency of both polymeric and monomeric silica over the current art.

It is another advantage of the invention that the disclosed chemistry works in a manner to slow the self-polymerization of silica, maintaining a portion of the silica in monomeric form.

It is a further advantage of the invention to allow for the softening and easier removal of existing silica scale.

It is yet another advantage of the invention that the chemistry is thermally stable at temperatures in excess of 300° C. for greater than 5 hours.

It is another advantage of the invention that it can be coupled with tracing capabilities, making it compatible with fluorescent tracing technology such TRASAR® technology (available from Nalco® Company, Naperville, Ill., USA).

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE INVENTION

Polymers for use in the disclosed invention are relatively low molecular weight polymers and preferably have an average molecular weight ranging from about 5,000 to 200,000 as described in more detail below. The organic polymers of the present invention are preferably those polymers or copolymers which have acrylic acid or methacrylic acid functionality. Exemplary polymers include: homopolymers of acrylic acid having an average molecular weight from about 5,000 to about 200,000; copolymers of methacrylic acid and polyethylene glycol allyl ether having average molecular weights of from about 5,000 to about 7,000; homopolymers of methacrylic acid having an average molecular weight of about 15,000; copolymers of acrylic acid and polyethylene glycol allyl ether having an average molecular weight of from about 5,000 to about 7,000; copolymers of acrylic acid and 1-allyloxy-2-hydroxypropane sulfonic acid having an average molecular weight of about 32,000; and combinations thereof.

In an embodiment, the polymers of the invention are water soluble homo-polymers and co-polymers utilizing carboxylated and alkoxylated monomers. Representative alkoxy groups include propoxy (propylene oxide), ethoxy (ethylene oxide), and hydroxyl substituted alkyl chains and combinations therein. In an embodiment, the polymers of the invention are water soluble homo-polymers and co-polymers utilizing carboxylated and alkoxylated monomers. More specifically the alkoxylated monomer can be derivatized from either ethylene oxide, propylene oxide, or any combination thereof. Average substitution ranges from about 4 to about 20 mole percent.

The weight average molecular weight (MW) of the polymers preferably ranges from about 5,000 Da to about 200,000 Da, with the polymer actives typically between about 25%-100%. The dosage ranges for the invention are about 1-100 ppm.

Representative polymers of the invention include water soluble co-polymers of either acrylic acid, methacrylic acid, or maleic anhydride and an ethoxylated monomer where that monomeric head is either an acrylate, methacrylate, or allylic moiety and the ethoxylate appendage generally between 5-15 units. The monomer units in these co-polymers can be ratioed from 90:10 to 10:90, respectively. Preferably, the ratio of the monomer units are between 40:60 and 60:40, respectively. Polymer actives typically exist at upwards of 100% but due to viscosity limitations for certain applications (e.g., pumpability for transport or dosing) most exemplary polymer actives levels have been positioned between 35% and 50%. Typical working MW ranges are between about 10,000 Da and about 100,000 Da based on manufacturing conditions and supplier quality, but targeted MW are between about 20,000 Da and about 35,000.

In an embodiment, the polymer is 2-Propenoic acid, polymer with α-2-propen-1-yl-ω-hydroxypoly(oxy-1,2-ethanediyl), sodium salt, peroxydisulfuric acid ([(HO)S(O)2]2O2) sodium salt (1:2)-initiated (CAS No. 137898-98-7).

In an embodiment, the polymer is 2-Propenoic acid, polymer with α-2-propen-1-yl-ω-hydroxypoly(oxy-1,2-ethanediyl) block copolymer (CAS No. 1010818-79-7).

In an embodiment, the polymer is 2-Propenoic acid, polymer with α-2-propen-1-yl-ω-hydroxypoly(oxy-1,2-ethanediyl) graft copolymer (CAS No. 185506-87-0).

In embodiments, the polymer of the invention exists in various salt forms having a counterion, such as sodium, potassium, and ammonium.

This invention provides methods for inhibiting the formation and deposition of silica and silicate compounds in water systems. The methods include adding to the water in a water system an effective amount inhibiting amount of a polymer according to this invention.

The precise effective dosages at which the polymers can be employed will vary depending upon the makeup of the water being treated. For example, an effective dosage (based on total polymer) for treating cooling water will usually be in the range of about 0.5 to about 500 ppm. In alternative embodiments dosage ranges of about 1 to about 100 ppm or about 5 to about 60 ppm may be used. In embodiments, dosages between about 5 ppm and 50 ppm may also be used. Typical dosages for treating industrial system water can range from about 10,000 to about 100,000 ppm. In embodiments, the polymers may be added directly into the water system being treated as an aqueous solution intermittently or continuously.

The industrial waters that require treatment with the polymers of this invention are generally waters that contain silica in a dissolved, suspended or colloidal form. The silica is present as dissolved, silicic species, silicates, or their complex ions and may also be present as colloidal silica or suspended silica. The total silica concentration in these industrial waters is normally low. When it exceeds about 120-150 ppm in total concentration; amorphous silica scale formation then becomes a problem. However, in the presence of common cations, such as Ca, Mg, Zn, Al, Se, etc, present in the water, much lower level of silica can cause scaling/deposition problems. Obviously, the higher the concentration of total silica from all sources in these waters, the more difficult is the problem created by amorphous silica scale formation.

The industrial waters may be cooling waters, geothermal waters, salt water for desalinization purposes, industrial waters being prepared for boiler treatment and steam generation, downhole waters for petroleum crude recovery, pulp and paper mill waters, mining and mineral processing waters and the like. The problem of amorphous silica scale formation on the surfaces in contact with these industrial waters is particularly noted when the industrial waters are alkaline, having a pH of at least 5.0 or above, and contain at least 5 ppm total silica as $SiO_2$. The effective use of the polymers of this invention are preferably at pH's of at least 5.0 and above and may be at temperatures ranging between ambient temperatures to temperatures in excess of 500° F. However, as one skilled in the art of water treatment would appreciate, the polymers of this invention should also be effective in waters having a pH lower than 5.0.

Of particular importance is the treatment of alkaline industrial waters being used as cooling waters, either on a once-through basis or particularly in a recirculating cooling water system. When these alkaline cooling waters contain sufficient total silica, the problem of amorphous silica scale formation on surfaces in contact with these cooling waters is exaggerated. As the alkalinity increases, the problem of amorphous silica scale formation also increases. Therefore, the effectiveness of the polymers used in this invention must also be demonstrated at pH in excess of about 8.0.

Although not required to implement this invention, it is contemplated that the scale-inhibiting polymers of the invention may be combined with one or more corrosion inhibitors, one or more other scale inhibitors, one or more fluorescent tracers, one or more water treatment polymers, one or more polyalkoxy compounds, or any other suitable adjunct or additional component. Any such adjuncts may be part of an existing program to which the invention becomes an additional component or program. In alternative embodiments, such adjuncts may be added simultaneously or sequentially with the polymers of the invention.

It should be appreciated that the method, in certain embodiments, may be combined with other utilities known in the industry. Representative utilities include sensors for measuring the content of various additives in the system; dissolved or particulate contaminant sensors; other sensors based upon resistance, capacitance, spectroscopic absorbance or transmittance, calorimetric measurements, and fluorescence; and mathematical tools for analyzing sensor/controller results (e.g., multivariate analysis, chemometrics, on/off dosage control, PID dosage control, the like, and combinations thereof).

In another embodiment, an inert fluorescent tracer is included in the synergistic blend to provide a means of determining the dosage level. A known proportion of the fluorescent tracer is added either simultaneously or sequentially with the blend. Effective inert fluorescent tracers include those substances that are chemically non-reactive with other components in the system and that do not significantly degrade with time. Such tracers should also be completely (or essentially completely) soluble in the blend at all relevant levels of concentration and preferably the fluorescence intensity should be substantially proportional to its concentration and not significantly quenched or otherwise diminished by other components in the system. Furthermore, the inert fluorescent tracer should not be appreciably or significantly affected by any other chemistry in the system. The statement, "not appreciably or significantly affected," means that an inert fluorescent compound generally has no more than about a 10% change in its fluorescent signal, under conditions normally encountered in fuel ethanol.

Desired characteristics for an inert fluorescent tracer preferably include: fluorescence excitation/emission wavelengths that do not have significant overlap with light absorbing substances present in the water of the system, other additives, contaminants, etc.; high solubility; excellent chemical stability; suitable fluorescence properties at manageable wavelengths (e.g., other components in the system should not interfere with the fluorescence properties at those wavelengths) and excitation/emission wavelengths that are separate from other fluorescent components that may be present in the system to prevent interference; and avoiding negative impacts on the properties of the system.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E (α-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids. Additional examples of such inert fluorescent tracers may be found in U.S. Pat. No. 6,966,213 B2, entitled "Rapid Method for Detecting Leaks of Hydraulic Fluids in Production Plants" and U.S. Pat. No. 7,169,236 B2, entitled "Method of Monitoring Membrane Cleaning Process." These inert fluorescent tracers are either commercially available, for example, under the tradename TRASAR from Nalco Company or may be synthesized using techniques known to persons of ordinary skill in the art of organic chemistry.

Finally, the polymers of this invention may be combined with other water treating agents. For example, the polymers may be used with water treatments, such as those used to inhibit corrosion and those treatments used to disperse or prevent scale formation of other types.

Representative scale inhibitors include, but are not limited to, inorganic and organic polyphosphate, phosphonates, and polycarboxylates. These inhibitors help inhibit or disperse other scales such as calcium carbonate, calcium sulfate, calcium phosphate, calcium fluoride, barium sulfate, calcium oxalate, and the like. Inhibition of these scales helps the polymer reach its full potential for inhibiting silica/silicate deposit.

Inorganic polyphosphates include compounds composed of phosphate units linked by phosphoanhydride bonds as shown in the following formula:

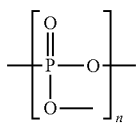

where $n$ = 2-20

Organic polyphosphates (polymeric organic phosphate) include esters of polyphosphates as shown in the following formula:

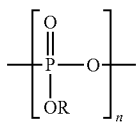

where R is substituted or unsubstituted alkyl or aryl and n=2-20. Representative inorganic and organic polyphosphates include sodium tripolyphosphate, sodium hexametaphosphates, anionic silicone phosphate ester, alkyl phosphate esters, and the like.

Phosphonates include compounds containing the structural moiety

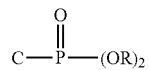

where R is H or substituted or unsubstituted alkyl, or aryl. Representative phosphonates include commercially available products including HEDP (1-hydroxy ethylidene 1,1-diphosphonic acid and its salts), AMP (amino tri(methylene phosphonic acid) and its salts), PAPEMP (polyamino polyether methylene phosphonic acid and its salts), and the like.

Polycarboxylates comprise polymers composed of monomers containing carboxylic acid functional group or salts thereof including, for example, acrylic acid, methacrylic acid, α-haloacrylic acid, maleic acid or anhydride, vinylacetic acid, allylacetic acid, fumaric acid, and β-carboxylethylacrylate, and the like. Representative polycarboxylates include low molecular weight commercially available water soluble polyacrylic acid, polymaleic acid, acrylic acid-AMP copolymers, and the like.

Polyphosphate, phosphonates and polycarboxylates and their use for inhibiting scale is known in the art. See, for example, U.S. Pat. Nos. 4,874,527, 4,933,090 and 5,078,879.

The foregoing can be better understood by reference to the following examples, which are presented for purposes of illustration and are not intended to limit the scope of the invention.

Example 1

Stagnant Flask Study

This test was conducted using a 300 ppm test solution comprised of sodium silicate as $SiO_2$, 80 ppm as Mg from magnesium sulfate, 100 ppm as total alkalinity from sodium bicarbonate, and 200 ppm as calcium from calcium chloride. The pH of the test solution was adjusted between 8.5-9.0. These test solutions were dosed with varying amounts of silica inhibitor and a constant amount (2 ppm) of 2-phosphonobutane-1,2,4-tricarboxylic acid (generally referred to as PBTC) as calcium carbonate inhibitor. Theses samples were thermostated at 60° C. Samples were withdrawn at various times and filtered through 2.5 micron filter prior to being analyzed for, silica, at pH 7-7.5. Sample 1 was 50/50 acrylic acid (AA)/polyethoxy methacrylate (HEMA) at 40% actives. Sample 2 was 40/60 AA/hydroxypolyethoxy allyl ether AAE at 40% actives. Sample 3 was 50/50 AA/AAE at 40% actives. Sample 4 was 60/40 AA/AAE at 40% actives.

| | Soluble Silica (ppm) | | | | |
|---|---|---|---|---|---|
| Time | Blank | Sample 1 | Sample 2 | Sample 3 | Sample 4 |
| T = 0 hrs | 320 | 266 | 305 | 312 | 313 |
| T = 24 Hrs | 171 | 217 | 266 | 256 | 289 |

Example 2

Pilot Cooling Tower Study

The following water was used in this study: Calcium (Ca) 12 mg/L; Magnesium (Mg) 4.0 mg/L; Potassium (K) 2.5 mg/L 2.6 mg/L; Silica ($SiO_2$) 89 mg/L; Sodium (Na) 13 mg/L; Chloride (Cl) 4.3 mg/L; Nitrate ($NO_3$) 1.6 mg/L; Sulfate ($SO_4$) 2.4 mg/L; Chloride ($CaCO_3$) 6.1 mg/L; Total Alkalinity ($CaCO_3$) 71 mg/L; Conductivity at 25° C. 150 μS/cm; and pH @ 25° C. 8.3 pH Units.

The water was dosed with 20 ppm of the silica inhibitor of the invention and 20 ppm of the calcium carbonate inhibitor (PBTC). The water was recirculated in several heat exchanger loops and heat rejected through a cooling tower. In this process, the water was concentrated between 3-3.5 times (concentration factor) from the original water chemistry. The pH in the recirculating loop was recorded at ~8.9. The delta temperature between the heat exchanger inlet and exit was 10° F. The water chemistry was monitored in the recirculating loop and the heat exchangers were monitored for any fouling.

Results found that there was no observable deposition found on the heat exchangers and there was 97% recovery for all the ions in the concentration loop as a result of the silica inhibitor.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method for inhibiting the formation and deposition of silica and silicate compounds in a water system, the method comprising adding to the water in the water system about 10,000 ppm to about 100,000 ppm of one or more low molecular weight anionic polymers selected from the group consisting of: homopolymers of acrylic acid; copolymers of methacrylic acid and polyethylene glycol allyl ether; homopolymers of methacrylic acid; copolymers of acrylic acid and polyethylene glycol allyl ether; copolymers of acrylic acid and 1-allyloxy-2-hydroxypropane sulfonic acid; homopolymers of maleic anhydride; copolymers of maleic anhydride and polyethylene glycol allyl ether; and combinations thereof.

2. The method of claim 1, wherein the one or more low molecular weight polymers have a weight average molecular weight of about 5,000 Da to about 200,000 Da.

3. The method of claim 1, wherein the one or more low molecular weight polymers are copolymers of methacrylic acid and polyethylene glycol allyl ether having average molecular weights of from about 5,000 to about 7,000 Da.

4. The method of claim 1, wherein the one or more low molecular weight polymers are copolymers of acrylic acid and polyethylene glycol allyl ether having an average molecular weight of from about 5,000 to about 7,000 Da.

5. The method of claim 1, wherein the one or more low molecular weight polymers are copolymers of acrylic acid and 1-allyloxy-2-hydroxypropane sulfonic acid having an average molecular weight of about 32,000 Da.

6. The method of claim 1, wherein the one or more low molecular weight anionic polymers comprise water soluble homo-polymers and co-polymers utilizing carboxylated and alkoxylated monomers.

7. The method of claim 6, wherein the one or more low molecular weight polymers comprise propoxy, ethoxy, hydroxy substituted alkyl chains, and combinations thereof.

8. The method of claim 7, wherein the one or more low molecular weight polymers comprise an average substitution ranges from about 4 to about 20 mole percent.

9. The method of claim 1, wherein the water system is selected from cooling water systems, geothermal water systems, salt water desalinization systems, boiler water systems, downhole water systems for petroleum crude recovery, pulp and paper mill water systems and mining and mineral processing water systems.

10. The method of claim 1, wherein the water system is a cooling water system.

11. The method of claim 1, further comprising adding one or more additional corrosion inhibitors, scale inhibitors, or dispersants to the water system.

12. The method of claim 11, wherein the scale inhibitors or dispersants are selected from the group consisting of: inorganic and organic polyphosphates, phosphonates, polycarboxylates, and combinations thereof.

13. The method of claim 1, wherein the one or more low molecular weight polymers have a weight average molecular weight of about 200,000 Da.

14. The method of claim 1, further comprising the step of adding an inert fluorescent tracer to the water in the water system.

* * * * *